United States Patent
Seibert

(10) Patent No.: US 11,897,142 B2
(45) Date of Patent: Feb. 13, 2024

(54) METHOD AND DEVICE FOR CREATING A ROBOT CONTROL PROGRAM

(71) Applicant: BYSTRONIC LASER AG, Niederonz (CH)

(72) Inventor: Friedemann Seibert, Winterbach/Pfalz (DE)

(73) Assignee: BYSTRONIC LASER AG, Niederonz (CH)

( * ) Notice: Subject to any disclaimer, the term of this patent is extended or adjusted under 35 U.S.C. 154(b) by 336 days.

(21) Appl. No.: 17/283,028

(22) PCT Filed: Oct. 4, 2019

(86) PCT No.: PCT/EP2019/076913
§ 371 (c)(1),
(2) Date: Apr. 6, 2021

(87) PCT Pub. No.: WO2020/070287
PCT Pub. Date: Apr. 9, 2020

(65) Prior Publication Data
US 2021/0339391 A1  Nov. 4, 2021

(30) Foreign Application Priority Data
Oct. 6, 2018 (DE) .......................... 102018124671.4

(51) Int. Cl.
*B25J 9/16* (2006.01)

(52) U.S. Cl.
CPC ........... *B25J 9/1664* (2013.01); *B25J 9/1697* (2013.01)

(58) Field of Classification Search
CPC ...... B25J 9/1664; B25J 9/1697; B25J 9/1656; G05B 2219/3544; G05B 2219/40116; G05B 19/42
See application file for complete search history.

(56) References Cited

U.S. PATENT DOCUMENTS

2004/0019402 A1*  1/2004  Bourne ..................... B21D 5/02
                                                                700/165
2009/0228130 A1*  9/2009  Fujino ................ G05B 19/4097
                                                                700/103
(Continued)

FOREIGN PATENT DOCUMENTS

DE    11 2016 006 116 T5    9/2018
JP         2011110621 A  *  6/2011  ................ B25J 3/04

OTHER PUBLICATIONS

J. Lambrecht and J. Krüger, "Spatial programming for industrial robots based on gestures and Augmented Reality," 2012 IEEE/RSJ International Conference on Intelligent Robots and Systems, Vilamoura-Algarve, Portugal, 2012, pp. 466-472, doi: 10.1109/IROS.2012. 6385900. (Year: 2012).*

(Continued)

*Primary Examiner* — Abby Y Lin
*Assistant Examiner* — Dylan Brandon Mooney
(74) *Attorney, Agent, or Firm* — BelayIP

(57) ABSTRACT

The present disclosure relates to a method for creating a robot control program for operating a machine tool, in particular a bending machine, having the steps of generating image material of a machining operation of a workpiece on the machine tool by means of at least one optical sensor; extracting at least one part of the workpiece and/or at least one part of a hand of an operator handling the workpiece from the image material; generating a trajectory and/or a sequence of movement points of at least one part of the workpiece and/or at least one part of a hand of an operator from the extracted image material; and creating a robot control program by reverse transformation of the trajectory and/or the sequence of movement points.

12 Claims, 3 Drawing Sheets

(56) References Cited

U.S. PATENT DOCUMENTS

2016/0257002 A1* 9/2016 Takayama ................ B21D 5/02
2018/0345491 A1* 12/2018 Iwamoto ................ B25J 9/1656
2019/0202058 A1* 7/2019 Dai ........................ B25J 9/1671
2019/0321983 A1* 10/2019 Chen ..................... B25J 9/1656

OTHER PUBLICATIONS

English Language Machine Translation of DE112016006116 T5.
Spatial Programming for Industrial Robots Through Task Demonstration, by Jens Lambrecht et al., INTECH, 2013, DOI 10.5772/55640.
International Preliminary Report on Patentability for PCT/EP2019/076913.

* cited by examiner

METHOD AND DEVICE FOR CREATING A ROBOT CONTROL PROGRAM

CROSS REFERENCE TO RELATED APPLICATIONS

This application is a national phase application of International Application No. PCT/EP2019/077240, filed Aug. 8, 2019 and claims priority to German Patent Application DE 10 2018 125 085.1, filed Oct. 10, 2018, the contents of both of which are herein incorporated by reference.

BACKGROUND OF THE INVENTION

The present invention relates to a method and device for creating a robot control program for operating a machine tool. In particular, the invention relates to a method for creating a robot control program according to claim 1 and a device for creating a robot control program for operating a machine tool according to claim 10.

A machine tool is used to manufacture and machine workpieces using tools. For example, sheet metal working machines, in particular bending machines or presses such as press brakes or laser cutting machines are considered to be machine tools here.

Workpieces are increasingly inserted into or removed from machine tools by robots. As a result, the step of robot control programming, that is the creation of a program for controlling the movement of the robot, must be additionally incorporated into the set-up process of a machine tool.

Robots are typically programmed using operating consoles or portable control consoles. In this case the operator is often in the danger zone of the robot and therefore can only move the same at creep speed. In some cases, robots are also "taught" by manual tracking, but the operator in this case stands next to the robot, so dangers can arise here as well. In addition, the programming is time-consuming.

DE 11 2016 006 116 T5 discloses a procedure for the creation of a robot control program. The creation of the program is based on recognition of fingers of a worker and estimation of a work content of the worker.

JENS LAMBRECHT ET AL: "Spatial Programming for Industrial Robots Through Task Demonstration", INTERNATIONAL JOURNAL OF ADVANCED ROBOTIC SYSTEMS, vol. 10, no. 254, 23 May 2013 (2013 May 23), pages 1-10, XP055302454, AT, ISSN: 1729-8806, DOI: 10.5772/55640 discloses a system for programming robots with the use of 3D bare-hand gestural interaction and a mobile AR-based application on common handheld devices.

BRIEF SUMMARY OF THE INVENTION

The aim of the invention is to avoid the disadvantages of the prior art and to provide improved robot control programming for a machine tool. Alternative aims are to provide an improved method for creating a robot control program or an improved device for creating a robot control program.

This aim is achieved by a method according to claim 1 or a device according to claim 10.

A method according to the invention is provided for creating a robot control program for operating a machine tool, in the form of a bending machine, and comprises the steps:

generating image material of a machining operation of a workpiece on the bending machine by means of at least one optical sensor;

extracting at least one part of the workpiece and/or at least one part of a hand of an operator handling the workpiece from the image material by comparing a 3D object of the workpiece known from a bending plan with the image material;

generating a trajectory and/or a sequence of movement points of at least one part of the workpiece and/or at least one part of a hand of an operator from the extracted image material; and creating a robot control program by reverse transformation of the trajectory and/or the sequence of movement points; and dividing the image material into handling sections, in which the hand is in contact with the workpiece, and into machining sections, in which the hand is not in contact with the workpiece; and controlling gripping tools of the robot accordingly at the transitions between the sections.

In contrast to known systems, the robot here references or reacts to the movement of the operator or the position of the workpiece in the room. The operator can bend a sample part, and the movements of the operator or the change in position of the bending part in the room are converted into a movement of the robot. The robot does not necessarily have to be there. The operator does not have to specify how the robot moves its axes; this can be calculated by the robot controller. In this case, the trajectory of the workpiece or the hand, which can correspond to a trajectory of the tool centre point of the robot, is converted into the motion sequence of the robot. The tool centre point is the attachment point of the robot for the gripper and can be seen as a counterpart to the wrist of the operator.

The method according to the invention for creating a robot control program proposes that a camera system can record the movements of an operator or of the workpiece and the movements of the operator or of the workpiece are converted by means of a computer system into direct movement of the robot. For this purpose, the arm of the operator can be divided into a plurality of sub-sections, corresponding to or correlating with the joints of the robot, and the hand can be understood to be a gripper. Each movement of the sub-sections of the arm or the hand is then performed online and at the same speed so that the operator can teach the robot from behind a safety fence or at a safe distance.

By dividing the image material into handling sections the opening state of the gripper can also be derived by means of simple image recognition.

Similarly, the operator can also program the robot via a video feed. This allows the operator to bend a part while being observed by the camera. Thereafter, this recording or the image material is converted into movements of the robot so that a similar situation arises as if an experienced operator were showing a colleague the hand movements.

A method according to the invention for creating a robot control program has the advantage of substantially simplifying and speeding up the programming of a robot. The robot control programs can be created without any knowledge of a robot controller; the journeyman shows the apprentice once how to bend a sheet by bending a part and the apprentice or robot learns this action the first time.

According to the method of the invention, the bending sequence of the part to be machined can be created in advance and stored in the controller. For example, the bending angle amount, the bending force and the sequence of bending steps can be adopted from the bending plan. This information can be used both for the robot controller and for image processing.

It is possible, during the extraction, for the spatial position of the workpiece, at least the spatial position of a gripping region of the workpiece, and/or the spatial position of the hand to be determined. Instead of a relative reference, for example, to a bending tool, a general referencing in Cartesian coordinates can be determined, which can be easier to process and to transform.

It is also possible for the trajectory and/or the sequence of movement points to be in machine coordinates and, before the reverse transformation, for there to be a transformation into robot coordinates. Thus, the image recording environment, the camera, etc. can be measured and calibrated in the context of the machine. Instead of machine coordinates, another coordinate system, for example the camera, can also be used.

It is possible for finger positions of the operator to be detected and used to control gripping tools of the robot. Gestures can be identified by means of which special functions of the robot can also be adopted. For example, the detected "hand on" gesture can be translated into the "gripper on" command.

It is also possible, after completion of a machining step, in particular a bending operation, for the shape of the 3D object to be updated accordingly. The modified shape of the workpiece after the machining step is then updated by the new 3D object from the bending plan. The updated shape can be used for image recognition and also for the robot controller.

It is possible for the trajectory and/or the sequence of movement points to be saved and for the saved trajectory and/or sequence of movement points to be transmitted to at least one robot controller for creating a robot control program. This allows offline programming of one or more robots, even those from different manufacturers.

It is also possible for the image material to be generated by means of a camera and for a spatial position of the workpiece to be determined on the basis of at least two optical features, such as edges, corners, surfaces and combinations thereof. By means of two optical features, the spatial position of the workpiece can be clearly and accurately determined.

It is possible for the image material to be generated by means of two cameras and for a spatial position of the workpiece to be determined on the basis of at least one optical feature, such as an edge, corner or surface. Two cameras can be used to capture and evaluate a stereo or 3D image so that one optical feature is sufficient for determining the spatial position of the workpiece.

The device according to the invention is provided for creating a robot control program for operating a machine tool, in the form of a bending machine, and comprises:
- a bending machine configured for machining a workpiece;
- at least one optical sensor configured for generating image material of a machining operation of a workpiece on the bending machine; and
- at least one computing unit configured for extracting at least one part of the workpiece and/or at least one part of a hand of an operator handling the workpiece from the image material, for generating a trajectory and/or a sequence of movement points from the extracted image material by comparing a 3D object of the workpiece known from a bending plan with the image material and for creating a robot control program by reverse transformation of the trajectory and/or the sequence of movement points, wherein the computing unit is configured for dividing the image material into handling sections, in which the hand is in contact with the workpiece, and into machining sections, in which the hand is not in contact with the workpiece, and that gripping tools of the robot are controlled accordingly at the transitions between the sections.

The device is configured to carry out methods as described above. The same advantages and modifications otherwise apply as described above.

According to the device of the invention, the bending sequence of the part to be machined can be created in advance and stored in the controller. For example, the bending angle amount, the bending force and the sequence of bending steps can be adopted from the machining plan. This information can be used both for the robot controller and for image processing.

By way of an embodiment, a computing unit may be connected to a bending machine and the optical sensor to be configured for extracting at least one part of the workpiece and/or at least one part of a hand of an operator handling the workpiece from the image material and for generating a trajectory and/or a sequence of movement points from the extracted image material and that a robot controller is configured for creating a robot control program by reverse transformation of the trajectory and/or the sequence of movement points. In this way, the resources can be used efficiently for programming the robot on the basis of the movement of at least one part of the workpiece and/or at least one part of a hand of an operator.

By way of an embodiment, the computing unit is configured for updating, after completion of a machining step, in particular a bending operation, the shape of the 3D object, accordingly. The modified shape of the workpiece after the machining step is then updated by the new 3D object from the bending plan. The updated shape can be used for image recognition and also for the robot controller.

By way of an embodiment, the device comprises a camera configured for generating the image material and that the computing unit is configured for determining a spatial position of the workpiece on the basis of at least two optical features, such as edges, corners, surfaces and combinations thereof. By means of two optical features, the spatial position of the workpiece can be clearly and accurately determined.

Further advantages, features and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

BRIEF DESCRIPTION OF THE SEVERAL
VIEWS OF THE DRAWINGS

The invention is explained below in exemplary embodiments with reference to the corresponding drawings. The following is shown in the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as Including only one of A, only one of B, only one of C, or any combination of A, B, and C.

Figure 1:
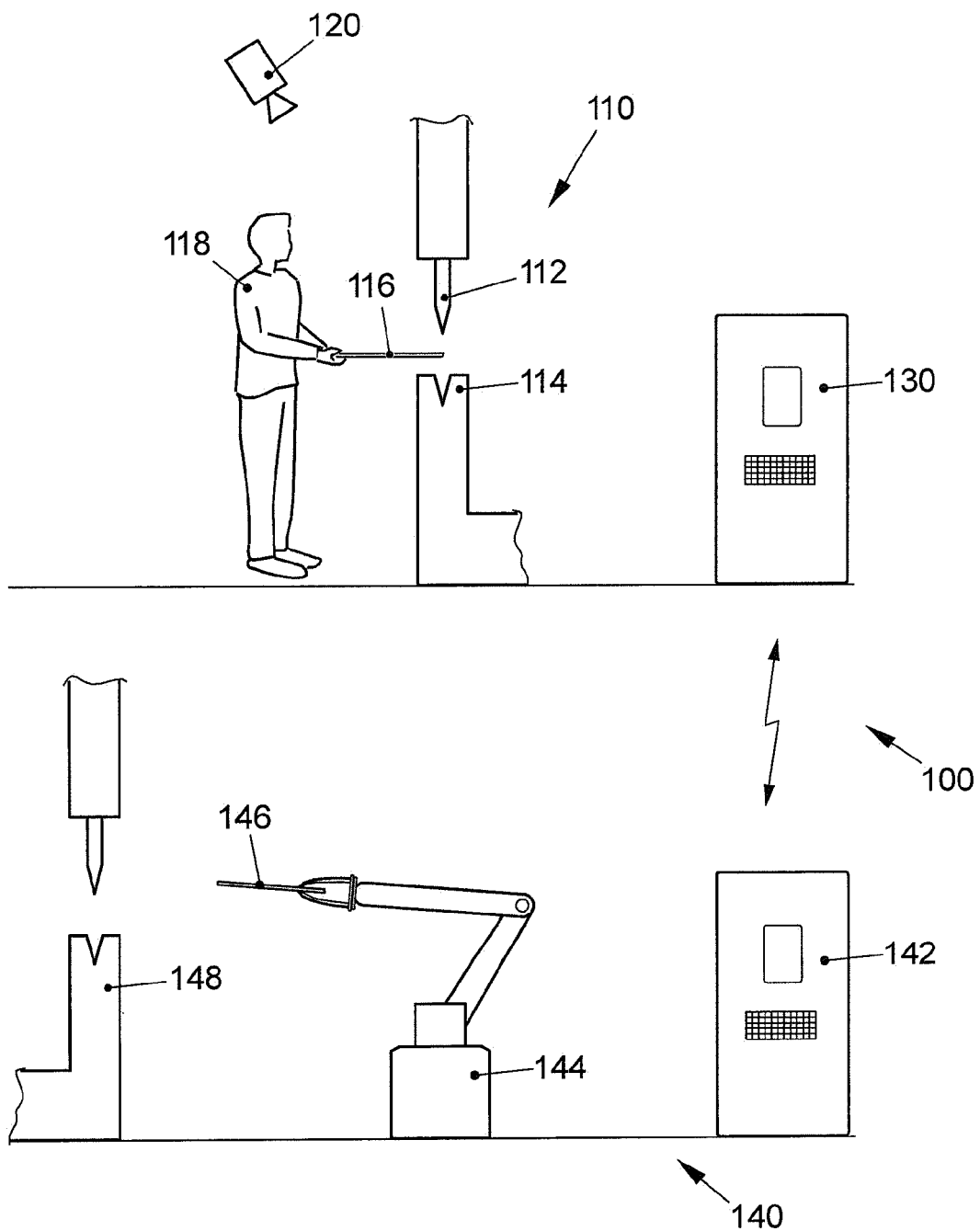
FIG. 1 is a schematic representation of a device for creating a robot control program for operating a machine tool.

FIG. 1 shows a schematic representation of a device 100 for creating a robot control program for operating a machine tool 110. The machine tool 110 is a sheet metal working machine in the form of a bending machine, particularly a press brake.

The machine tool 110 is shown in a greatly simplified sectional view. The machine tool 110 comprises an upper tool 112 and a lower tool 114. A workpiece 116, such as a thin sheet, is bent by the machine tool 110. An operator 118 inserts the workpiece 116 in the machine tool 110, where it is then bent between the upper tool 112 and the lower tool 114. If the workpiece 116 is bent several times, the workpiece 116 is removed from the machine tool 110 by the operator 118 and inserted again until the bending operation is completed.

This machining operation or bending operation is captured by an optical sensor here in the form of a camera 120. A laser scanner can also be used as an optical sensor. It is also possible to use a plurality of optical sensors for generating three-dimensional data.

The camera 120 generates image material of the workpiece 116 and/or at least the hand of the operator 118. In this case, a video stream or even individual images can be generated by the camera 120. The image material is transmitted to a computing unit 130, which can be designed as an independent unit or can be a component of the machine tool 110.

The image material is further processed in the computing unit 130 by means of image processing, which can be performed in hardware and/or software. In this case, individual coordinates or a trajectory of coordinates are generated. This generation is described in more detail with reference to the following figures.

If the coordinates or the trajectory are present in the coordinate system of the machine tool 110, the coordinates or the trajectory are transformed into a coordinate system of a robot system 140, for which the robot control program is to be created for operating a machine tool.

Accordingly, the coordinates or the trajectory are transmitted to a computing unit 142 of the robot system 140. The computing unit 142 creates the robot control program by means of a reverse transformation of the coordinates or of the trajectory. By means of this robot control program, an industrial robot 144 is then controlled, which handles the machining of a workpiece 146 in a machine tool 148. In this case, the workpiece 146 corresponds to the workpiece 116. The machine tool 148 can correspond to the machine tool 110. Another type of machine tool can also be used.

During the reverse transformation or inverse kinematics, the last link of the kinematic chain, the gripper, is moved and brought into the desired position. The arm elements of the robot, as the remaining links of the chain, must then take appropriate positions according to the degrees of freedom of their joints. This movement of the gripper or tool centre point (TCP), i.e. the coordinates or trajectory, is created by generating and processing the image material. From these Cartesian coordinates, the joint angles for the individual joints of the robot are then calculated during the reverse transformation, for example by applying transformation matrices. The robot control program is then created from a sequence of these joint angles.

In this way, the industrial robot 144 can be programmed without knowledge of the programming language of the robot 144 by filming and evaluating the operator 118. In addition, offline programming is possible, during which the device 100 for recording the movement of the operator 118 or of the workpiece 116 and the robot system 140 are spatially distant from one another. Temporally speaking, a time interval between the recording and processing of the data in the device 100 and the creation of the robot control program in the robot system 140 can be provided by caching the data.

Figure 2:
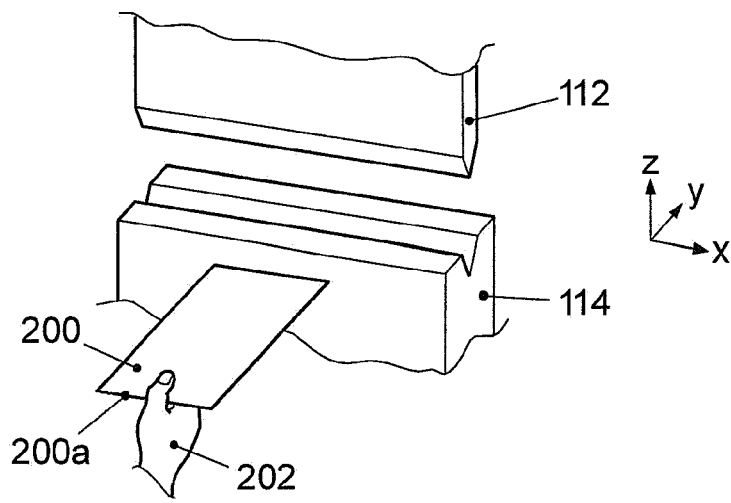
FIG. 2 is a schematic representation of image material representing a workpiece when inserted into the machine tool.

FIG. 2 shows a schematic representation of image material taken by the camera 120. The image material can be a photographic representation that is a single image. It can also be part of a film or video stream.

The image material shown in FIG. 2 forms a workpiece 200 when inserted into the machine tool, i.e. between the upper tool 112 and the lower tool 114. A hand 202 of the operator 118 holds the workpiece 200 at an edge 200a during insertion into the machine tool.

This edge 200a can be used, for example, as a reference edge for generating a trajectory or a sequence of movement points. Other features of the workpiece 200 can also be used for referencing the position of the workpiece 200 in space or with respect to the upper tool 112 or the lower tool 114. For example, the two end points of the edge 200a or the entire outer contour of the workpiece 200 can be used. The reference feature, here in the form of the reference edge 200a, is traced through the image material by an algorithm, such as image processing, so that spatial changes can be tracked and the changing coordinates can be determined.

Figure 3:
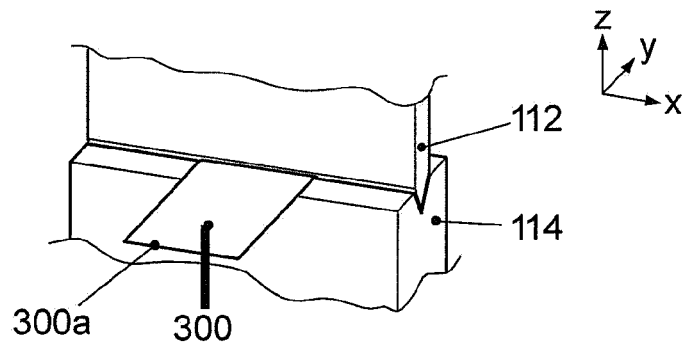
FIG. 3 is a schematic representation of image material representing a workpiece during machining in the machine tool.
Figure 4:
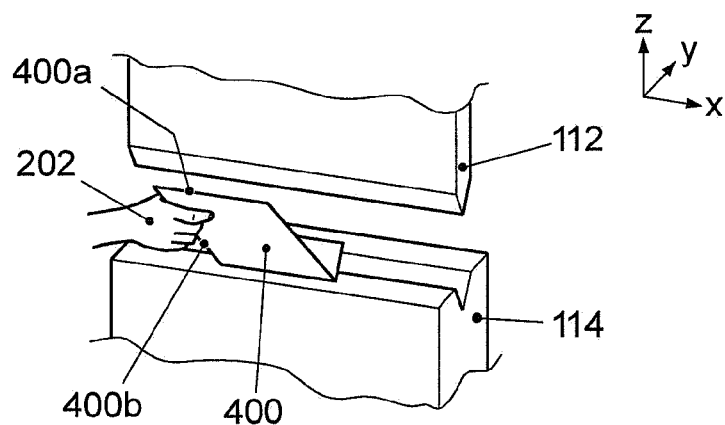
FIG. 4 is a schematic representation of image material representing a workpiece during removal from the machine tool.

For the purpose of illustration, FIGS. 2 to 4 each show a coordinate system to which the coordinates of the workpiece or of parts of the workpiece relate. The coordinate system is not present in the image material recorded by the camera.

Likewise, the hand 202 of the operator can be used as a reference for generating a trajectory or a sequence of movement points.

Individual fingers of the operator's hand 202 can also be detected and used as inputs to control the robot's gripper. This can comprise simple commands such as gripper open or close, but also more complex gripper actions where individual gripper fingers can be controlled according to the operator's fingers.

To improve optical recognition during generation of the image material, the workpiece 200 and/or the hand 202 can be colour-coded. For this purpose, the workpiece 200 can be painted accordingly and the operator can use a differently coloured glove. It is also possible for optical patterns to be provided on the workpiece 200 and/or on the glove, which allow accurate tracking of the corresponding object in the image material. To discriminate between the hand and workpiece, for example, special sensors or cameras, such as thermal cameras could be used.

FIG. 3 shows the workpiece 300 during the bending operation, in which it is clamped between the upper tool 112 and the lower tool 114. The hand of the user is therefore not on the workpiece 300 and thus not in the image material, as shown in FIG. 3.

In this way, the image material can be divided into handling sections, in which the hand is in contact with the workpiece (FIG. 2), and into machining sections, in which the hand is not in contact with the workpiece (FIG. 3). This can take place by image identification or image processing. Thus, the gripping tool of the robot can be controlled accordingly at the transitions between the sections. While the gripper should be closed in the section of FIG. 2 (which includes further images that are not shown here), it is opened in the section of FIG. 3 (which also includes other images not shown here).

FIGS. 2 to 4 merely show snapshots or individual representations in a series of images or in a continuous image sequence. The image is evaluated for each individual representation, such as, in this example, determining of the reference edge 300a and testing for the presence of the operator's hand. Of the reference features, such as the edge 300a or the user's hand, the coordinates and/or status (hand present, opened, etc.) are captured frame by frame. Thus, a sequence of coordinates or trajectory can be generated, along which the tool centre point or the gripper of the robot is to move.

In FIG. 3, the edge 300a of the workpiece 300 is already moved slightly upward by the bending operation. In the subsequent images (not shown here) of the image material, the edge 300a of the workpiece 300 will continue to move until a contour of the workpiece is reached, as shown in FIG. 4 after completion of the bending step.

Since the robot does not have to grip the workpiece 300 during the bending process, image capturing and/or image processing need not necessarily be carried out during a bending operation.

When removed as shown in FIG. 4, an interaction of the robot similar to the movement of the hand 202 is then necessarily required again and thus also the image capturing and image processing.

FIG. 4 shows a representation of the image material with the workpiece 400 after completion of the first bending operation. The contour of the workpiece 400 is thereby changed in comparison with the unfinished state of the workpiece 200 in FIG. 2. The modified 3D contours can be provided from the bending plan to the image processing and also to the robot controller to improve the accuracy of the image processing, such as, for example, the extraction of the workpiece or a reference feature of the workpiece or to facilitate a check of the running program.

As shown in FIG. 4, the operator's hand 202 holds an edge 400b, as in this example the previous reference edge 400a is to be bent in a next bending step and therefore has to be inserted between the upper tool 112 and the lower tool 114.

Therefore, the edge 400b can become the new reference edge, for example. Alternatively, and additionally to the reference edges, the hand 202 or a part of the hand 202, such as fingers or a marker (also on a glove), can be used as a reference for the coordinates of the tool centre point or the gripper.

In the image material which follows the representation of FIG. 4 and is no longer shown here, the operations of inserting (similar to FIG. 2) the workpiece, machining (similar to FIG. 3) the workpiece and removing (similar to FIG. 4) the workpiece are repeated until the machining or bending has been fully completed.

Figure 5:
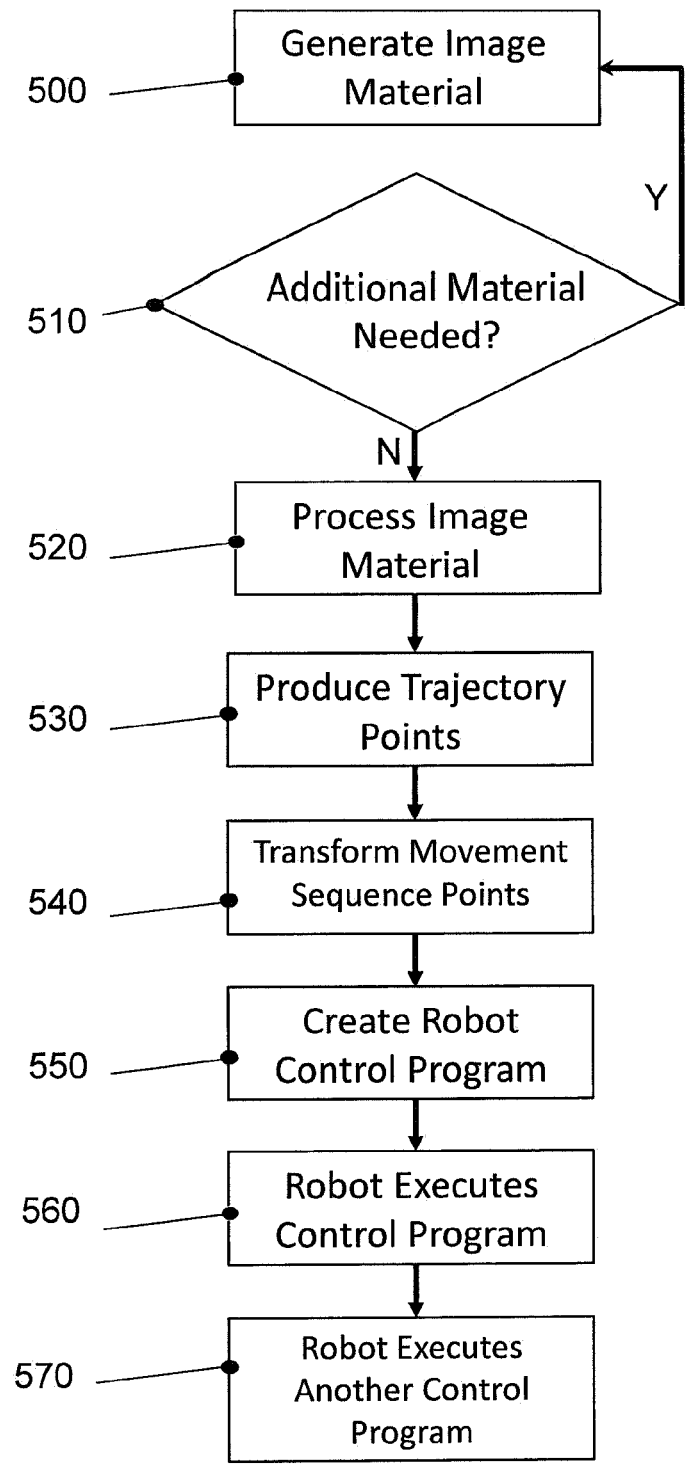
FIG. 5 shows a flow chart of a method for creating a robot control program.

FIG. 5 shows a flowchart of the method for creating the robot control program.

In a first step 500, image material of a machining operation of a workpiece on the machine tool is generated by means of at least one optical sensor.

In a second step, checks are made as to whether further image material should be produced, for example because the machining of the workpiece has not yet been completed. If this is the case, the method jumps back to step 500 so that a continuous generation and, optionally also, recording of the image material occurs.

If the generation of image material is completed, on the other hand, the method jumps to step 520. The image material is processed and used from step 520. The image material can be processed and used when the image material exists in full, such as in a manner of post-processing, or during creation, in real time or quasi real time.

In step 520, at least one part of the workpiece, for example the reference edge, and/or at least one part of a hand of an operator handling the workpiece is extracted from the image material. In this case, corresponding matching or comparison algorithms can be used which compare the 3D object of the workpiece known from the bending plan with the image material. During the extraction, the spatial position of the workpiece, at least the spatial position of a gripping region of the workpiece, and/or the spatial position of the hand can be determined.

In step 530, a trajectory and/or a sequence of movement points of at least one part of the workpiece and/or at least one part of a hand of an operator is produced from the extracted image material. The trajectory or the movement points in each case comprise coordinates that can then be used to guide the robot.

In step 540, an optional transformation of the trajectory and/or the sequence of movement points from machine coordinates into robot coordinates occurs, if these are present in machine coordinates.

In step 550, a robot control program is created by reverse transformation of the trajectory and/or of the sequence of movement points.

In an optional step 560, this robot control program is executed by a robot. A robot can now process the workpieces accordingly. This is done on the basis of the recorded images of a human operator and the image processing, but without the classic programming of the robot.

In an optional step 570, this robot control program is executed by another robot. Advantageously, a multiplication in the programming can be achieved in this way, which can significantly increase efficiency. A database can also be created using sequences of motion associated with a particular product which have been created once. This can be refined with even more detail to store individual bending operations of a product or workpiece. In this way, for example, programs for variants of a workpiece can be easily created in which, for example, only one edge is bent differently.

The method presented here for creating a robot control program for operating a machine tool allows simple and precise programming of robots without knowledge of special programming language. In addition, by learning the movements of the part to be processed and/or the hand of the operator, the degrees of freedom of the robot can be much better used and the fastest or shortest path can always be selected.

The invention claimed is:

1. A method for creating a robot control program for operating bending tool, the method comprising the steps of:
   generating image material of a machining operation of a workpiece on the bending machine by means of at least one optical sensor;
   extracting at least one part of at least one of the workpiece and at least one part of a hand of an operator handling the workpiece from the image material by comparing a 3D object of the workpiece known from a bending plan with the image material;
   generating at least one of a trajectory and a sequence of movement points of at least one of at least one part of the workpiece and at least one part of a hand of an operator from the extracted image material;
   creating a robot control program by reverse transformation of at least one of the trajectory and the sequence of movement points;
   dividing the image material into handling sections, in which the hand is in contact with the workpiece, and into machining sections, in which the hand is not in contact with the workpiece; and
   controlling gripping tools of the robot accordingly at the transitions between the sections.

2. The method according to claim 1, wherein during extraction of the spatial position of the workpiece, at least one of at least the spatial position of a gripping region of the workpiece and the spatial position of the hand is determined.

3. The method according to claim 1, wherein at least one of the trajectory and the sequence of movement points is present in machine coordinates and that, before the reverse transformation, a transformation into robot coordinates occurs.

4. The method according to claim 1, wherein finger positions of the operator are detected and used to control gripping tools of the robot.

5. The method according to claim 1, wherein, after completion of at least one of a machining step and a bending operation, the shape of the 3D object is updated accordingly.

6. The method according to claim 1, wherein at least one of the trajectory and the sequence of movement points are saved, and that at least one of the saved trajectory and sequence of movement points is transmitted to at least one robot controller for creating a robot control program.

7. The method according to claim 1, wherein the image material is generated by means of a camera and that a spatial position of the workplace is determined on the basis of at least two optical features, the at least two optical features comprising at least one of edges, corners and surfaces.

8. The method according to claim 1, wherein the image material is generated by means of two cameras and that a spatial position of the workpiece is determined on the basis of at least one optical feature, the at least one optical feature comprising at least one of-an edge, corner or surface.

9. A device for creating a robot control program for operating a bending machine, the device comprising:
   the bending machine configured to machine a workpiece;
   at least one optical sensor configured to generate image material of a machining operation of the workpiece; and
   at least one computing unit configured for:
      extracting at least one of at least one part of the workpiece and at least one part of a hand of an operator handling the workpiece from the image material by comparing a 3D object of the workplace known from a bending plan with the image material,
      generating at least one of a trajectory and a sequence of movement points from the extracted image material,
      creating a robot control program by reverse transformation of at least one of the trajectory and the sequence of movement points, and
      wherein the computing unit is configured for dividing the image material into handling sections, in which the hand is in contact with the workpiece, and into machining sections, in which the hand is not in contact with the workpiece, and wherein gripping tools of the robot are controlled accordingly at the transitions between the sections.

10. The device according to claim 9, wherein:
    the computing unit is connected to the bending machine,
    the optical sensor is configured for at least one of extracting at least one part of the workpiece and at least one part of a hand of an operator handling the workpiece, from the image material and for generating at least one of a trajectory and a sequence of movement points from the extracted image material, and
    a robot controller is configured for creating a robot control program by reverse transformation of at least one of the trajectory the sequence of movement points.

11. The device according to claim 9 wherein the computing unit is configured for updating, after completion of at least one of a machining step and a bending operation, the shape of the 3D object, accordingly.

12. The device according to claim 9, further comprising a camera configured for generating the image material, and the computing unit is configured for determining a spatial position of the workpiece on the basis of at least two optical features, the at least two optical features comprising at least one of edges, corners, and surfaces.

* * * * *